April 25, 1933. J. F. DUFFY 1,905,371

MAT

Filed July 29, 1929

Inventor
James Francis Duffy
By Lawrence & Van Antwerp
Attorneys

Patented Apr. 25, 1933

1,905,371

UNITED STATES PATENT OFFICE

JAMES F. DUFFY, OF HOLLAND, MICHIGAN, ASSIGNOR TO DUFFY MANUFACTURING COMPANY, OF HOLLAND, MICHIGAN, A CORPORATION OF MICHIGAN

MAT

Application filed July 29, 1929. Serial No. 381,990.

This invention relates to mats and while of special utility in conjunction with mats used in automobiles, the mat structure is available for use in many other relations.

It is a primary object and purpose of the present invention to provide a mat which is relatively thick and which includes a rubber covering with a rubber border integral with the top or cover of the mat, the border depending from the edges of the mat covering, whereby a shallow recess over substantially the whole of the underside of the mat is produced, and in such recess locate, and cement to permanently secure in place, a filler preferably of heat insulating material, and which also has the property of holding the mat against aimless displacement due to the fictional contact of the underside of said filler with the floor boards of the motor vehicle on which the mat is placed or with any floor which carries the mat.

A further object of the invention is to provide a novel construction at the openings through which various control members for an automobile may pass, such as openings for the passage of the clutch and brake pedals and the steering post or other devices which may extend through the mat, making the openings large enough that the upper top or covering of rubber will not be engaged against the side of said steering post or pedals, but by filling the openings with the filler materials which do engage snugly against the sides of the devices which pass through the mat. This is of value particularly with respect to the clutch and brake pedals as the same are frequently moved in the operation of an automobile and any rubbing of the same against the rubber mars the contact portion of the rubber and detracts from the appearance.

A still further object of the invention is to provide a mat construction of the character stated, which is economical to produce and provides a relatively heavy and thick mat for automobiles, at a very low cost.

An understanding of the invention may be had from the following description, taken in connection with accompanying drawing, in which.

Like reference characters refer to like parts in the different figures of the drawing.

Figure 1:
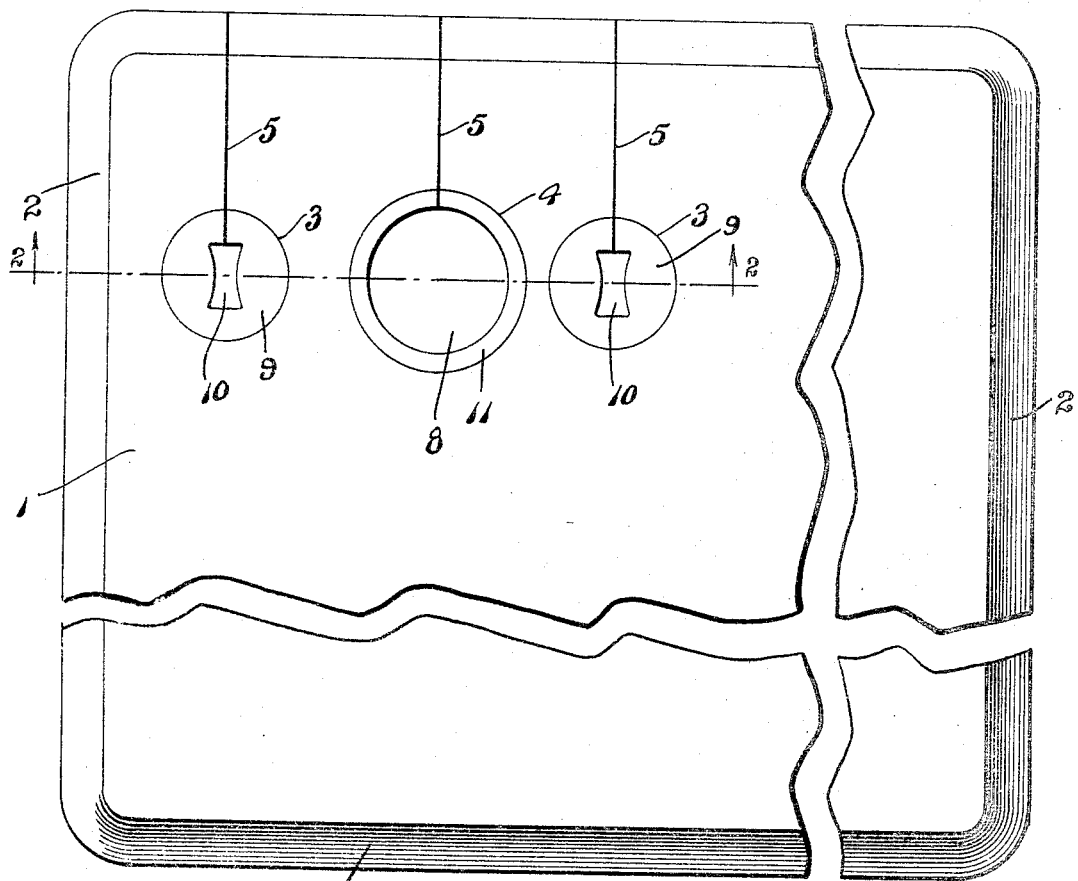
Fig. 1 is a plan view of the mat made in accordance with my invention, parts being broken away in order to condense the showing.

In the construction of the mat, an upper cover or top 1 of a size in accordance with the size of the mat is provided, which is relatively thin compared to the total thickness of the mat, and which at its edges has depending integral border sections 2, whereby there is provided at the underside of the rubber top or covering 1, an extended shallow recess, the depth of which is the distance that the border 2 extends below the underside of the top rubber covering 1. It will be noted that the inner sides of the border sections 2 are at right angles to the plane of the under side of the cover or top 1, making right angle corners, and that the border sections contain a considerable body of rubber, making the same of extra strength and durability.

When the mats are used with automobiles, various openings such as indicated at 3 and 4 are made in the top covering 1, at the places where the clutch and brake pedals and the steering post pass through the mat. Said openings 3 and 4 are larger than the cross sectional area of said pedals or steering post. Slits, as indicated at 5, extend from the openings to an edge of the mat, and the slits also extend through such parts of the filler hereafter described, as may be located in the openings 3 and 4.

Figure 2:
Fig. 2 is a fragmentary transverse section on the plane of line 2—2 of Fig. 1.

As shown in Fig. 2, the filler 6, which may be of any suitable fabric, such as felt or the like, is located in the recess at the underside of the mat and is permanently secured therein. Preferably the filler 6 is glued or cemented both at its top and edges to the cover or top member. Openings 7 and 8 are made through the filler under the openings 3 and 4 and are of less size than said openings 3 and 4. The opening 8 through which the steering post passes in the filler may be of the same size as the cross sectional area of the post, inasmuch as when once in place the post and mat do not have relative movement with respect to each other. But the openings at 7 through which pass the clutch and brake pedals are larger than the cross sectional area of said pedal members whereby movements of the pedals do not rub the same against the filler 6.

The upper side of the filler is flush, in Fig. 2, with the underside of the top rubber covering 1. In the openings 3, suitable disks 9, preferably of sponge rubber, are cemented and these have openings 10 therein such that the clutch and brake pedals, while they pass through said openings, are snugly engaged on all sides by the sponge rubber material from which the disks 9 are made. A similar ring 11, also of sponge rubber, having an opening of the same size as the opening 8, is located in the opening 4 made through the rubber covering 1, and is cemented in place.

Figure 3:
Fig. 3 is a similar fragmentary section, showing a modification in the construction differing somewhat from that shown in Fig. 2.

In Fig. 3, instead of using the sponge rubber disks and rings 9 and 11, the filler 12 of felt or other fabric is provided with projections 9a and 11a extending through the openings 3 and 4; and the openings 10 for the clutch and brake pedals are of the same dimensions as the openings 10 in disks 9 in the structure previously described.

Figure 4:
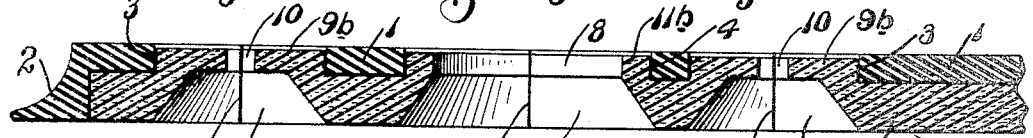
Fig. 4 is a similar section illustrating a further different form.

In Fig. 4 the filler 13 is of sponge rubber and has projections 9b and 11b extending into the openings 3 and 4 in the rubber covering 1. They are likewise provided with the openings 10 for the passage of the clutch and brake pedals and the opening for the steering post, and the said openings at their lower portions may be enlarged and tapered outwardly and downwardly as indicated at 7a and 8a.

In both the modifications shown in Figs. 3 and 4 the edges of the projections, 9a, 9b, 11a and 11b, are cemented to the interior edges of the respective openings through the top or cover.

A mat constructed as described in any of the three forms provides a relatively thick, yet flexible, mat having a wearing upper surface of rubber with a filler of heat insulating material, and the rubbing of the clutch and brake pedals is against the filler material rather than against the upper covering of rubber, thus avoiding any unsightly appearance likely to be caused by direct contact by the moving clutch and brake pedals with a black and glossy rubber surface. The passage of heat from the engine through the mat is eliminated to a large degree. The mat is soft and yet has great resistance to wear because of the wear resisting qualities of the rubber cover. It is, of course, to be understood that the upper surface of the mat may be made in accordance with any particular design both for the sake of appearance and to guard against slipping when stepping on the mat. The invention is defined in the appended claims and is to be considered comprehensive of all forms of structure coming within their scope.

I claim:

1. A mat comprising a relatively thin cover or top of flexible wear resisting material having depending border sections at the edges thereof, thereby providing a recess at the underside of the mat substantially co-extensive with said top or cover, said cover or top having openings therethrough and a flexible heat insulating filler permanently secured in said recess of the mat with its underside and the under edges of said border sections located in the same horizontal plane, said filler extending into and filling the openings in said cover, and having smaller openings therethrough at the places where it fills the openings in the cover.

2. A mat of the class described comprising a cover of flexible material, said cover having an opening therethrough, and a flexible heat insulating filler permanently secured to the underside of the mat; said filler extending into and filling the opening in said cover, and having a smaller opening therethrough at the place where it fills the opening in the cover.

3. A mat as set forth in claim 2 but further characterized by the fact that the said smaller openings are enlarged outwardly and downwardly.

4. A mat of the class described comprising a cover of flexible material, said cover having an opening therethrough, and a flexible heat insulating filler permanently secured to the underside of the mat; said filler extending underneath the opening in said cover, and having a smaller opening therethrough at the place where it extends underneath the opening in the cover.

In testimony whereof I affix my signature.

JAMES F. DUFFY.